US008543985B2

(12) United States Patent
Kahlon (10) Patent No.: US 8,543,985 B2
(45) Date of Patent: Sep. 24, 2013

(54) SYSTEM AND METHOD FOR VERIFICATION OF PROGRAMS USING THREADS HAVING BOUNDED LOCK CHAINS

(75) Inventor: Vineet Kahlon, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 739 days.

(21) Appl. No.: 12/753,291

(22) Filed: Apr. 2, 2010

(65) Prior Publication Data

US 2011/0010693 A1   Jan. 13, 2011

Related U.S. Application Data

(60) Provisional application No. 61/223,532, filed on Jul. 7, 2009.

(51) Int. Cl.
*G06F 9/44* (2006.01)

(52) U.S. Cl.
USPC ........................................... 717/126

(58) Field of Classification Search
USPC ........................................... 717/126
See application file for complete search history.

(56) References Cited

U.S. PATENT DOCUMENTS

| 6,324,496 | B1* | 11/2001 | Alur et al. ............. 703/17 |
| 7,779,382 | B2* | 8/2010 | Rehof et al. ........... 717/104 |
| 2006/0218534 | A1* | 9/2006 | Kahlon et al. ......... 717/124 |
| 2007/0011671 | A1* | 1/2007 | Kahlon et al. ......... 717/170 |
| 2008/0086722 | A1* | 4/2008 | Kahlon et al. ......... 717/131 |

OTHER PUBLICATIONS

Klaus Schneider. 2001. Improving Automata Generation for Linear Temporal Logic by Considering the Automaton Hierarchy. In Proceedings of the Artificial Intelligence on Logic for Programming (LPAR '01), Robert Nieuwenhuis and Andrei Voronkov (Eds.). Springer-Verlag, London, UK, UK, 39-54.*

Carlos Hoppen and Nicholas Wormald. 2008. Induced forests in regular graphs with large girth. Comb. Probab. Comput. 17, 3 (May 2008), 389-410. DOI=10.1017/S0963548307008905 http://dx.doi.org/10.1017/S0963548307008905.*

Flanagan, C., et al. "Dynamic Partial-Order Reduction for Model Checking Software" Proceedings of the 32nd ACM SIGPLAN-SIGACT symposium on Principles of programming languages (POPL '05). Jan. 2005. pp. 1-12.

Flanagan, C., et al. "Thread-Modular Model Checking" Proceedings of the SPIN Workshop on Software Verification, May 2003. (12 Pages).

Kahlon, V., et al. "On the Analysis of Interacting Pushdown Systems" Proceedings of the Conference on Principles of Programming Languages (POPL). Jan. 2007. (15 Pages).

* cited by examiner

*Primary Examiner* — James D Rutten
(74) *Attorney, Agent, or Firm* — Joseph Kolodka (57) ABSTRACT

A system and method for model checking of concurrent multi-threaded programs with bounded lock chains includes analyzing individual program threads in a concurrent multi-threaded program to determine sets of reachable states and lock access patterns for bounded lock chains by tracking sets of states reachable from a given set of states and tracking lock acquisitions and releases by maintaining a bi-directional lock causality graph. Analysis results from multiple threads are combined using an acceptance condition of the lock causality graph to determine whether there is a violation of a correctness property in the concurrent multi-threaded program.

15 Claims, 4 Drawing Sheets

```
void T₁(){
a1:  lock(l₄);
a2:  lock(l₅);
a3:  unlock(l₄);
a4:  unlock(l₅);
a5:  unlock(l₁);
a6:  lock(l₃);
a7:  Race₀;
}
```

```
void T₂(void){
b1:  lock(l₄);
b2:  unlock(l₅);
b3:  unlock(l₃);
b4:  lock(l₁);
b5:  lock(l₂);
b6:  unlock(l₄);
b7:  Race₁;
}
```

SYSTEM AND METHOD FOR VERIFICATION OF PROGRAMS USING THREADS HAVING BOUNDED LOCK CHAINS

RELATED APPLICATION INFORMATION

This application claims priority to provisional application Ser. No. 61/223,532 filed on Jul. 7, 2009, incorporated herein by reference.

BACKGROUND

1. Technical Field

The present invention relates to computer program verification and analysis, and more particularly to a system and method capable of efficient analysis of threads with bounded lock chains.

2. Description of the Related Art

Multi-threading is a standard way of exploiting parallelism among different components of a computer system. As a result, the use of concurrent multi-threaded programs is becoming pervasive. Examples include operating systems, databases, embedded systems (cell phones, multimedia consumer products), etc.

Existing techniques for testing and verifying sequential programs are inadequate in handling concurrent programs, largely due to the many possible interleavings between concurrent modules, leading to subtle and hard-to-debug errors. This has led to an interest in developing efficient and scalable methods for analyzing concurrent programs.

Conventional methods for restricting the set of interleavings to be explored includes Partial Order Reduction (POR), Thread-Modular Model Checking and the Acquisition History Method. A main idea behind POR is to partition all interleavings of the given program into classes based on the partial order they induce on shared objects. Then, it suffices to explore only one interleaving per partial order.

The Thread-Modular Model Checking technique is based on over-approximating the behavior of other threads when analyzing the behavior of a given thread in a concurrent program. These over-approximations are hard to generate both manually and automatically as the problem of model checking is theoretically unsolvable.

The acquisition history method works only for concurrent programs with nested locks and involves tracking lock acquisition patterns for nested locks via acquisition histories. To decide reachability, a consistency check is then performed on the acquisition histories.

SUMMARY

A system and method for model checking of concurrent multi-threaded programs with bounded lock chains includes analyzing individual program threads in a concurrent multi-threaded program to determine sets of reachable states and lock access patterns for bounded lock chains by tracking sets of states reachable from a given set of states and tracking lock acquisitions and releases by maintaining a bi-directional lock causality graph. Analysis results from multiple threads are combined and acceptance criteria are employed to determine whether there is a violation of a correctness property in the concurrent multi-threaded program.

A system for model checking of concurrent multi-threaded programs with bounded lock chains includes a model checking program stored in a memory storage device and executed by one or more processing cores. The model checking program is configured to analyze individual program threads in a concurrent multi-threaded program stored on memory storage media to determine sets of reachable states and lock access patterns for bounded lock chains. The model checking program is configured to track sets of states reachable from a given set of states and track lock acquisitions and releases by maintaining a bi-directional lock causality graph in the memory storage device. The model checking program is configured to use an acceptance condition of the lock causality graph to combine analysis results from multiple threads to determine whether there is a violation of a correctness property in the concurrent multi-threaded program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Model checking threads interacting purely via the standard synchronization primitives is important for many concurrent program analyses, particularly dataflow analysis. Unfortunately, it is undecidable even for the most commonly used synchronization primitive, i.e., mutex locks. Lock usage in concurrent programs can be characterized in terms of lock chains, where a sequence of mutex locks is said to be chained if the scopes of adjacent (non-nested) mutexes overlap. Although the model checking problem for fragments of Linear Temporal Logic (LTL) is known to be decidable for threads interacting via nested locks, i.e., chains of length one, these techniques do not extend to programs with non-nested locks used in applications like databases and device drivers.

Lock usage patterns in real life programs do not produce unbounded lock chains. For such a framework, by using a new concept of Lock Causality Automata (LCA), pre*-closures of regular sets of states can be computed efficiently. Leveraging this new technique then permits formulation of decision procedures for model checking threads communicating via bounded lock chains for fragments of linear temporal logic (LTL). These results narrow the decidability gap for LTL model checking of threads communicating via locks by providing a more refined characterization for it in terms of boundedness of lock chains rather than the current state-of-the-art, i.e., nestedness of locks (chains of length one).

In accordance with the present principles, a system and method for computer program verification employs a bi-directional lock causality graph to build a lock causality automaton that captures a set of reachable configurations in a concurrent program with bounded lock chains. The system/method then constructs lock causality automata for each basic temporal operator. The lock causality automata for the given temporal formula are constructed by composing the lock causality automata for each of its basic temporal operators.

The verification system/method is compositional and hence scalable, i.e., it can potentially verify large-sized programs. This is accomplished by avoiding construction of global state space of the given program thus bypassing any state explosion problem. The present embodiments are both sound and complete, thus avoiding bogus error traces that could be generated by techniques like thread modular model checking. This is extremely advantageous from a commercial standpoint as most of the resources spent in real life verification go into detecting/avoiding bogus error traces. The present embodiments are simple to implement and can easily be incorporated into existing tool flows, and they handle a broad range of properties as expressed using indexed versions of alternation-free Mu-calculus, not just deadlocks and data races.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable storage medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

With the increasing prevalence of multi-core processors and concurrent multi-threaded software, it is highly critical that dataflow analysis for concurrent programs, similar to the ones for the sequential domain, be developed. For sequential programs, Pushdown Systems (PDSs) have emerged as a powerful, unifying framework for efficiently encoding many inter-procedural dataflow analyses. Given a sequential program, abstract interpretation is first used to get a finite representation of the control part of the program while recursion is modeled using a stack. Pushdown systems then provide a natural framework to model such abstractly interpreted structures. Analogous to the sequential case, inter-procedural dataflow analysis for concurrent multi-threaded programs can be formulated as a model checking problem for interacting PDSs. While for a single PDS the model checking problem is efficiently decidable for very expressive logics, even simple properties like reachability become undecidable for systems with only two threads but where the threads synchronize using CCS-style pairwise rendezvous.

Concurrent programs have a lot of inherent structure that if exploited leads to decidability of many important problems of practical interest. These results show that there are important fragments of temporal logic and useful models of interacting PDSs for which efficient decidability results can be obtained. Since formulating efficient procedures for model checking interacting PDSs lie at the core of scalable data flow analysis for concurrent programs, such fragments need to be identified for the standard synchronization primitives. Furthermore, the need exists to delineate precisely the decidability boundary of the model checking problem for PDSs interacting via the standard synchronization primitives.

Nested locks are a prime example of how programming patterns can be exploited to yield decidability of the model checking problem for several important temporal logic fragments for interacting pushdown systems. However, even though the use of nested locks remains the most popular lock usage paradigm there are niche applications, like databases, where lock chaining is needed. Chaining occurs when the scopes of two mutexes overlap. When one mutex is needed, the code enters a region where another mutex is needed. After successfully locking that second mutex, the first one is no longer needed and is released. Lock chaining is a tool that is used for enforcing serialization, particularly in database applications. For example, a two-phase commit protocol which lies at the heart of serialization in databases uses lock chains of length 2. Other classic examples where non-nested locks occur frequently are programs that use both mutexes and (locks associated with) Wait/Notify primitives (condition variables) or threads traversing concurrent data structures like arrays in an iterative fashion.

Note that the lock usage pattern of bounded lock chains covers almost all cases of practical interest encountered in real-life programs. Note all lock usage does not need to be in the faun of bounded chains; however, if lock chains exist then they are to be bounded in length.

We consider the model checking problem for pushdown systems interacting via bounded lock chains for LTL properties. Decidability of a sub-logic of LTL hinges on whether it is expressive enough to encode, as a model checking problem, the disjointness of the context-free languages accepted by the PDSs in the given multi-PDS system, which is an undecidable problem. This, in turn, depends on the temporal operators permitted by the sub-logic thereby providing a natural way to characterize LTL-fragments for which the model checking problem is decidable. We use $L(Op_i, \ldots, Op_k)$ where $Op_i \in \{X, F, U, G, \overset{\infty}{F}\}$, to denote the fragment comprised of formulae of the form Ef, where f is an LTL formula in positive normal form (PNF), viz., only atomic propositions are negated, built using the operators $Op_i, \ldots, Op_k$ and the Boolean connectives $\wedge$ and $\vee$. Here X "next-time", F "sometimes", U, "until", G "always", and $\overset{\infty}{F}$ "infinitely-often" denote the standard temporal operators and E is the "existential path quantifier". L(X, U, G) is the full-blown LTL. It should be understood that other logics may be employed, e.g., branching temporal logic.

Pairwise reachability is decidable for threads interacting via bounded lock chains. We extend the envelope of decidability for concurrent programs with bounded lock chains to richer logic. Specifically, we show that the model checking problem for threads interacting via bounded lock chains is decidable not just for reachability but also the fragment of LTL allowing the temporal operators X, F, $\overset{\infty}{F}$ and the boolean connectives $\wedge$ and $\vee$, denoted by L(X, F, $\overset{\infty}{F}$). Note that while pairwise reachability is sufficient for reasoning about simple properties like data race freedom, for more complex properties one needs to reason about richer formulae. For instance, detecting atomicity violations needs reasoning about the fragment of LTL (and of L(X, F, $\overset{\infty}{F}$)) allowing the operators F, $\wedge$ and $\vee$.

We formulate procedures for fragments of LTL for which the problem of model checking dual-PDS systems synchronizing via bounded lock chains is decidable. Moreover, we also delineate the decidability/undecidability boundary for the problem. In accordance with the present principles, we provide that: 1). the model checking problem is undecidable for L(U) and L(G). This implies that to get decidability for dual-PDS systems interacting via bounded lock chains, we have to restrict ourselves to the sub-logic L(X, F, $\overset{\infty}{F}$). Since systems comprised of PDSs interacting via bounded lock chains are more expressive than those interacting via nested locks (chains of length one) these results follow immediately from the undecidability results for PDSs interacting via nested locks; and 2). for the fragment L(X, F, $\overset{\infty}{F}$) of LTL we show that the model checking problem is decidable.

This settles the model checking problem for threads interacting via bounded lock chains for LTL. The prior state-of-the-art characterization of decidability vs. undecidability for threads interacting via locks was in terms of nestedness versus non-nestedness of locks. We show that decidability can be re-characterized in terms of boundedness versus unboundedness of lock chains. Since nested locks form chains of length one, our results are more powerful than the existing ones. Thus, these new results narrow the decidability gap by providing a more refined characterization for the decidability of LTL for threads interacting via locks.

One contribution of this disclosure is the new notion of a Lock Causality Automaton (LCA) that is used to represent sets of states of the given concurrent program so as to allow efficient temporal reasoning about programs with bounded lock chains. To understand the motivation behind an LCA, when model checking a single PDS, we exploit the fact that the set of configurations satisfying any given LTL formula is regular and can therefore be captured via a finite automaton or, a multi-automaton. For a concurrent program with two PDSs $T_1$ and $T_2$, however, we need to reason about pairs of regular sets of configuration—one for each thread. An LCA is a pair of automata ($M_1$, $M_2$), where $M_i$ accepts a regular set of configurations of $T_i$. The usefulness of an LCA stems from the fact that not only does it permit us to reason about L(X, F, $\overset{\infty}{F}$) properties for concurrent programs with bounded lock chains, but that it permits us to do so in a compositional manner. Compositional reasoning permits us to reduce reasoning about the concurrent program at hand to each of its individual threads. This is crucial in ameliorating the state explosion problem. The main challenge in reducing model checking of a concurrent program to its individual threads lies in tracking relevant information about threads locally that enables us to reason globally about the concurrent program. For an LCA, this is accomplished by tracking regular lock access patterns in individual threads.

The model checking procedure for an L(X, F, $\overset{\infty}{F}$) formula f computes an LCA $L_f$ accepting the set of global states of the concurrent program satisfying f and then checks whether it accepts the initial state of the program. To compute $L_f$, we first formulate efficient procedures for computing an LCA $L_{Opf}$ accepting the set of states satisfying Opf, where Op $\in$ {X, F, $\overset{\infty}{F}$}, from an LCA $L_f$ accepting the set of states satisfying f. Recursively applying these procedures starting from the atomic propositions and proceeding inside out in f then gives us $L_f$.

The present principles provide a new notion of an LCA that permits reasoning about concurrent programs with bounded lock chains in a compositional manner. A model checking procedure for the fragment L(X, F, $\overset{\infty}{F}$), of LTL permits narrowing of the decidability gap for model checking LTL properties for threads communicating via locks. Delineation of the decidability boundary for the LTL model checking problem for threads synchronizing via bounded lock chains is provided.

Figure 1:
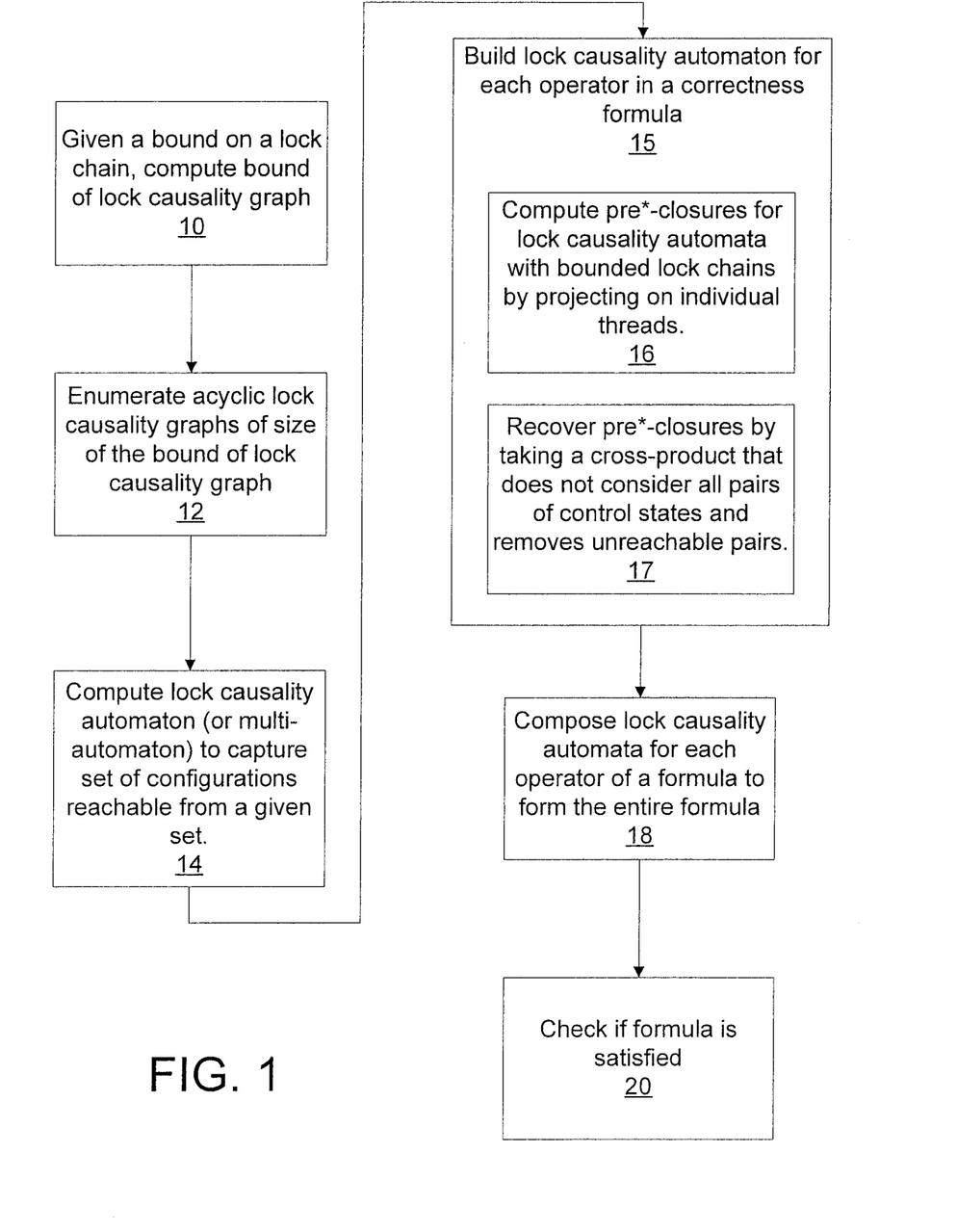
FIG. 1 is a block/flow diagram showing a system/method for verifying/analyzing a concurrent program using bounded lock chains in accordance with one embodiment.

Referring now to the drawings in which like numerals represent the same or similar elements and initially to FIG. 1, a block/flow diagram shows a system/method for computer verification, which employs model checking using a bounded lock chains technique in accordance with the present principles. In block 10, given a bound on a length of lock chains, compute a bound B on a size of the lock causality graph. In block 12, enumerate all acyclic lock causality graphs of size at most B. In block 14, the acyclic lock causality graphs are employed to compute a lock causality automaton that can capture the set of configurations reachable from a given set of regular configurations. A lock causality automaton accepts sets of configurations of a multi-threaded program. A multi-automaton can be extended to multi-threaded programs with bounded lock chains in a meaningful way in accordance with the present principles. This permits the expression of a model checking problem for such programs as a reachability problem for regular sets of configurations accepted by a lock causality automaton.

In block 15, using the lock causality automaton for reachability, lock causality automata are built for each temporal operator appearing in the given correctness formula. We show that we can reduce the reachability problem, or equivalently calculate the pre*-closure for a lock causality automata M for concurrent programs with bounded lock chains, to calculating the pre*-closure of certain lock causality automata that we get by projecting M onto individual threads in block 16. Once the pre*-closures for the projected automata are calculated, we can recover the pre*-closure of M by taking a specialized cross product that does not consider all resulting pairs of local control states of the individual threads, but removes those pairs that are not reachable in block 17.

We can keep the projection automata separate. Since we efficiently determine whether a pair of local control states of the individual threads are simultaneously reachable, we can merge these projected automata on-the-fly. Keeping them separate allows us to avoid a construction of the global automata, thereby circumventing the state explosion problem. It also permits us to use existing techniques and efficient tools for calculating the pre*-closure for lock causality automata corresponding to sequential programs for the individual threads.

In block 18, compose the lock causality automata for each operator to form the lock causality automaton for the entire formula (correctness formula). In block 20, the correctness formula is checked. The given formula is satisfied by the given concurrent program if the language accepted by the resulting automaton is non-empty.

System Model: We consider concurrent programs comprised of threads modeled as Pushdown Systems (PDSs) that interact with each other using synchronization primitives. PDSs are a natural model for abstractly interpreted programs used in applications like dataflow analysis. A PDS has a finite control part corresponding to the valuation of the variables of a thread and a stack which provides a means to model recursion.

Formally, a PDS is a five-tuple P=(Q, Act, $\Gamma$, $c_0$, $\Delta$), where Q is a finite set of control locations, Act is a finite set of actions, $\Gamma$ is a finite stack alphabet, and $\Delta \subseteq (Q \times \Gamma) \times Act \times (Q \times \Gamma^*)$ is a finite set of transitions. If ((p, $\gamma$), a, $\overline{(p',w)}) \in \Delta$ then we write $\langle p, \gamma \rangle$ a$\hookrightarrow \langle p',w \rangle$. A configuration of P is a pair $\langle p, w \rangle$, where p $\in$ Q denotes the control location and w $\in \Gamma^*$ the stack content. We call $c_0$ the initial configuration of P. The set of all configurations of P is denoted by C. For each action a, we define a relation $$\xrightarrow{a} \subseteq C \times C$$

as follows: if $\langle q, \gamma \rangle$ a$\hookrightarrow \langle q',w \rangle$, then $$\langle q, \gamma v \rangle \xrightarrow{a} \langle q', wv \rangle$$

for every $v \in \Gamma^*$—in which case we say that $\langle q', wv \rangle$ results from $\langle q', \gamma v \rangle$ by firing the transition $\langle q, \gamma \rangle$ a$\hookrightarrow \langle q',w \rangle$ P. A sequence $x=x_0 x_1, \ldots$ of configurations of P is a computation if $x_0$ is the initial configuration of P and for each i, $$x_i \xrightarrow{a} x_{i+1},$$

where a $\in$ Act.

We model a concurrent program with n threads and m locks $l_1, \ldots l_m$ as a tuple of the form $CP=(T_1, \ldots, T_n, L_1, \ldots L_m)$, where $T_1, \ldots T_n$, are pushdown systems (representing threads) with the same set Act of non-acquire and non-release actions, and for each i, $L_i \subseteq \{\bot, 1, \ldots, n\}$ is the possible set of values that lock $l_i$ can be assigned. A global configuration of CP is a tuple $c=(t_1, \ldots, t_n, l_1, \ldots l_m)$ where $t_1, \ldots, t_n$ are, respectively, the configurations of threads $T_1, \ldots, T_n$ and $l_1, \ldots l_m$ the values of the locks. If no thread holds the lock $l_i$ in configuration c, then $l_i = \bot$, else $l_i$ is the index of the thread currently holding $l_i$. The initial global configuration of CP is $(c_1, \ldots, c_n, \bot, \ldots, \bot)$, where $c_i$ is the initial configuration of thread $T_i$. Thus all locks are free to start with. We extend the relation a $\rightarrow$ to pairs of global configurations of CP in the standard way by encoding the interleaved parallel composition of $T_1, \ldots, T_n$.

A sequence $x=x_0, x_1, \ldots$ of global configurations of CP is a computation if $x_0$ is the initial global configuration of CP and for each i, $$x_i \xrightarrow{a} x_{i+1},$$

where either a $\in$ Act or for some $1 \leq j \leq m$=release ($l_j$)or a=acquire ($l_j$).

We consider correctness properties expressed as double-indexed Linear Temporal Logic (LTL) formulae. Here atomic propositions are interpreted over pairs of control states of different PDSs in the given multi-PDS system. Note that our properties do not take the stack contents of PDSs into account. This is because in dataflow analysis, the dataflow facts being tracked are usually modified only by the program statements at individual control locations. The stack is merely used to track the context, e.g., the order in which functions are called in reaching the current control location.

Conventionally, DP$\models$f for a given LTL formula f if and only if f is satisfied along all paths starting at the initial state of DP. Using path quantifiers, we may write this as DP$\models$Af. Equivalently, we can model check for the dual property $\neg$ Af= E$\neg$ f=Eg. Furthermore, we can assume that g is in positive normal form (PNF), viz., the negations are pushed inwards as far as possible using DeMorgan's Laws: ($\neg$ (p$\lor$ q))=$\neg$ p$\land$ $\neg$ q, $\neg$ (p$\lor$ q)=$\neg$ p$\land$ $\neg$ q, $\neg$ Fp$\equiv$Gq, $\neg$ (pUq)$\equiv$ G$\neg$ q$\lor$ $\neg$ qU($\neg$ p$\land$ $\neg$ q).

For Dual-PDS systems, it turns out that the model checking problem is not decidable for the full-blown double-indexed LTL but only for certain fragments. Decidability hinges on the set of temporal operators that are allowed in the given property which, in turn, provides a natural way to characterize such fragments. We use $L(Op_1, \ldots, Op_k)$, where $Op_i \in \{X, F, U, G, \overset{\infty}{F}\}$ to denote the fragment of double-indexed LTL comprised of formulae in positive normal form (where only atomic propositions are negated) built using the operators $(Op_1, \ldots, Op_k)$, and the Boolean connectives $\lor$ and $\land$. Here X "next-time", F "sometimes", U "until", G "always", and $\overset{\infty}{F}$ "infinitely-often" denote the standard temporal operators. L(X, U, G) is the full-blown double-indexed LTL.

We show decidability of the model checking problem for the fragment $L(X, F, \overset{\infty}{F})$ of LTL for concurrent programs with bounded lock chains. Given a $L(X, F, \overset{\infty}{F})$ formula f, we build automata accepting global states of the given concurrent program satisfying f. Towards that end, we first show how to construct automata for the basic temporal operators F, $\overset{\infty}{F}$ and X, and the boolean connectives $\land$ and $\lor$. In other words, given automata for $L(X, F, \overset{\infty}{F})$ formulae g and h, we show how to construct automata for formulae of the form Fg, $\overset{\infty}{F}$ g, Xg, g$\lor$ h and g$\land$ h. Then to compute an automaton for the given property f, we start by building for each atomic proposition prop of f, an automata accepting the set of states of the given concurrent program satisfying prop. Leveraging the constructions for the basic temporal operators and boolean connectives, we then recursively build the automaton accepting the set of states satisfying f via an inside out traversal of f. Then, if the initial state of the given concurrent program is accepted by the resulting automaton, the program satisfies f.

This approach, for LTL model checking of finite state/ pushdown systems, exploits the fact that for model checking it suffices to reason about regular sets of configurations of these systems. These sets can be captured using regular automata which then reduces model checking to computing regular automata for each of the temporal operators and boolean connectives. However, for concurrent programs, the sets of states that we need to reason about for model checking is not regular and cannot therefore be captured via a regular automaton.

Pairwise CFL-Reachability: A step in the computation of pre*-closure of LCAs is deciding Pairwise CFL-Reachability. Let CP be a concurrent program comprised of threads $T_1$ and $T_2$. Given pairs $c_1, c_2$ and $d_1, d_2$, with $c_i$ and $d_i$ being control locations of $T_i$, determine if there exists a path of CP leading from a global state with $T_i$ in $c_i$ to one with $T_i$ in $d_i$ in the presence of recursion and scheduling constraints imposed by locks. It is known that pairwise CFL-reachability is undecidable for two threads interacting purely via locks but decidable if the locks are nested and, more generally, for programs with bounded lock chains.

Lock Chains: Given a computation x of a concurrent program, a lock chain of thread T is a sequence of lock acquisition statements $acq_1, \ldots, acq_n$ fired by T along x in the order listed such that for each i, the matching release of $acq_i$ is fired after $acq_{i+1}$ and before $acq_{i+2}$ along x. However, the decision procedures for programs with bounded lock chains only apply to the case where $c_1$ and $c_2$ are lock-free, i.e., no lock is held by $T_i$ at $c_i$. To decide the pairwise CFL-reachability problem for the general case, we provide a Bi-directional Lock Causality Graph.

Figure 2:
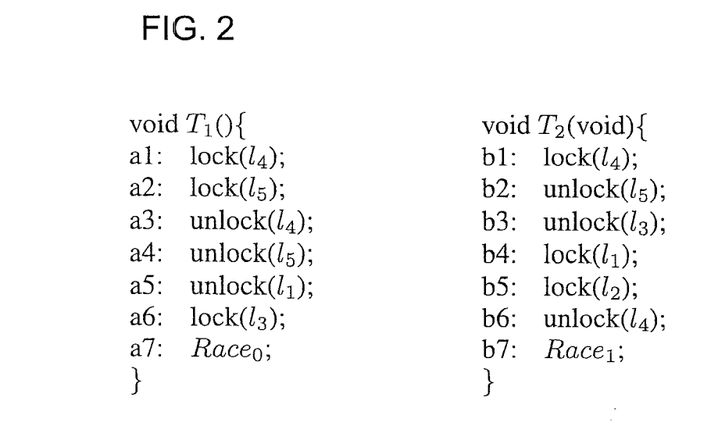
FIG. 2 is a sample program analyzed in accordance with the present principles.
Figure 3:
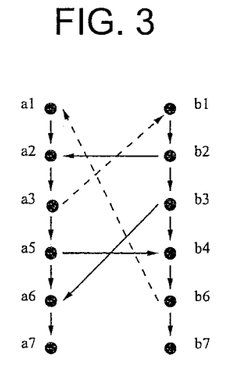
FIG. 3 is a lock causality graph for the program of FIG. 2 for a first thread.
Figure 4:
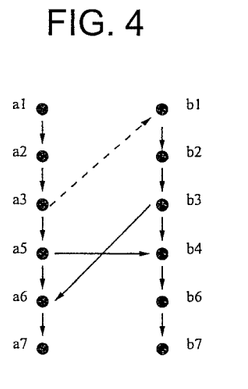
FIG. 4 is a lock causality graph for the program of FIG. 2 for a second thread.

Bidirectional Lock Causality Graph: Consider the example concurrent program comprised of threads $T_1$ and $T_2$ shown in FIG. 2. With reference to FIGS. 2, 3 and 4, suppose that we are interested in deciding whether a7 and b7 are pairwise reachable starting from the locations a1 and b1 of $T_1$ and $T_2$, respectively. Note that the set of locks held at a1 and b1 are $\{l_1\}$ and $\{l_3,l_5\}$, respectively. For a7 and b7 to be pairwise reachable, there must exist local paths $x^1$ and $x^2$ of $T_1$ and $T_2$ leading to a7 and b7, respectively, along which locks can be acquired and released in a consistent fashion.

We start by constructing a bi-directional lock causality graph $G_{(x^1,x^2)}$ that captures the constraints imposed by locks on the order in which statements along $x^1$ and $x^2$ need to be executed in order for $T_1$ and $T_2$ to simultaneously reach a7 and b7. The nodes of this graph are (the relevant) locking/unlocking statements fired along $x^1$ and $x^2$. For statements $c^1$ and $c^2$ of $G_{(x^1,x^2)}$, there exists an edge from $c^1$ and $c^2$, denoted by $c_i \leadsto c_2$, if $c_1$ must be executed before $c_2$ in order for $T_1$ and $T_2$ to simultaneously reach a7 and b7. $G_{(x^1,x^2)}$ has two types of edges (i) Seed edges and (ii) Induced edges. Seed edges, which are shown as bold (solid) edges in FIG. 3, can be further classified as (a) Backward and (b) Forward seed edges.

For forward seed edges, consider lock $l_1$ held at b7. Note that once $T_2$ acquires $l_1$ at location b4, it is not released along the path from b4 to b7. Since we are interested in the pairwise CFL-reachability of a7 and b7, $T_2$ cannot progress beyond location b7 and therefore cannot release $l_1$. Thus, we have that once $T_2$ acquires $l_1$ at b4, $T_1$ cannot acquire it thereafter. If $T_1$ and $T_2$ are to simultaneously reach a7 and b7, the last transition of $T_i$ that releases $l_1$ before reaching a7, i.e., a5, must be executed before b4. Thus a5 $\leadsto$ b4.

For backward seed edges, consider lock $l_5$ held at b1. For $T_1$ to acquire $l_5$ at a2, $l_5$ must first be released by $T_2$. Thus, the first statement of $T_1$ acquiring $l_5$ starting at a1, i.e., a2, must be executed after b2. Thus b2 $\leadsto$ a2.

The interaction of locks and seed causality edges can be used to deduce further causality constraints that are captured as induced edges (shown as dashed edges in the UCG in FIG. 3). These induced edges are needed in guaranteeing both soundness and completeness of our procedure.

For induced edges, consider the constraint b2 $\leadsto$ a2. At location b2, lock $l_4$ is held which was acquired at b1. Also, once $l_4$ is acquired at b1 it is not released until after $T_2$ exits b6. Thus, since $l_4$ has been acquired by $T_2$ before reaching b2 it must be released before a1 (and hence a2) can be executed. Thus, b6 $\leadsto$ a1.

METHOD 1: Bi-Directional Lock Causality Graph

---

1: Input: Local paths $x^1$ and $x^2$ of $T_1$ and $T_2$ leading from $c_1$ and $c_2$ to $d_1$ and $d_2$, respectively
2: for each lock l held at location $d_i$ do
3:   if c and c' are the last statements to acquire and release l occurring along $x^i$ and $x^{i'}$, respectively. then
4:     Add edge c' $\leadsto$ c to $G_{(x^1,x^2)}$.
5:   end if
6: end for
7: for each lock l held at location $c_i$ do
8:   if c and c' are the first statements to release and acquire l occurring along $x^i$ and $x^{i'}$, respectively. then
9:     Add edge c $\leadsto$ c' to $G_{(x^1,x^2)}$.
10:  end if
11: end for
12: repeat
13:   for each lock l do
14:     for each edge $d_{i'} \leadsto d_i$ to $G_{(x^1,x^2)}$ do
15:       Let $a_{i'}$ be the last statement to acquire l before $d_{i'}$ along $x^{i'}$ and $r_{i'}$ the matching release for $a_{i'}$
16:       Let $r_i$ be the first statement to release l after $d_i$ along $x^i$ and $a^i$ the matching acquire for $r^i$
17:       if l is held at either $d_i$ or $d_{i'}$ then
18:         if there does not exist an edge $b_{i'} \leadsto b_i$ such that $r_{i'}$ lies before $b_{i'}$ along $x^{i'}$ and $a_i$ lies after $b_i$ along $x^i$ then
19:           add edge $r_{i'} \leadsto a_i$ to $G_{(x^1,x^2)}$
20:         end if
21:       end if
22:     end for
23:   end for
24: until no new statements can be added to $G_{(x^1,x^2)}$
25: for i ∈ [1..2] do
26:   Add edges among locations of $x^i$ in $G_{(x^1,x^2)}$ to preserve their relative ordering along $x^i$
27: end for

---

Computing the Bidirectional Lock Causality Graph: Given finite local paths $x^1$ and $x^2$ of threads $T_1$ and $T_2$ starting at control locations $c_1$ and $c_2$ and leading to control locations $d_1$ and $d_2$, respectively, a method as set forth as METHOD 1 to compute $G_{(x^1,x^2)}$ adds the causality constraints one-by-one (forward seed edges via lines 2-6, backward seed edges via lines 7-11 and induced edges via lines 12-24) until we reach a fixpoint. Throughout the description of METHOD 1, for $I \in [1 \ldots 2]$, we use i' to denote an integer in $[1 \ldots 2]$ other than i. Note that the condition in line 18 in METHOD 1 ensures that we do not add edges representing causality constraints that can be deduced from existing edges.

Necessary and Sufficient Condition for CFL-reachability: Let $x^1$ and $x^2$ be local computations of $T_1$ and $T_2$ leading to $c_1$ and $c_2$. Since each causality constraint in $G_{(x^1,x^2)}$ is a happens-before constraint, we see that for $c_1$ and $c_2$ to be pairwise reachable $G_{(x^1,x^2)}$ has to be acyclic. In fact, it turns out that acyclicity is also a sufficient condition.

Theorem 1. (Acyclicity). Locations $d_1$ and $d_2$ are pairwise reachable from locations $c_1$ and $c_2$, respectively, if there exist local paths $x^1$ and $x^2$ of $T_1$ and $T_2$, respectively, leading from $c_1$ and $c_2$ to $d_1$ and $d_2$, respectively, such that (1) $L_{T_1}(c_i) \cap L_{T_2}(c_2) = \phi$ (disjointness of backward lock-sets), (2) $L_{T_1}(d_1) \cap L_{T_2}(d_2) = \phi$ (disjointness of forward locksets), and (3) $G_{(x^1,x^2)}$ is acyclic. Here $L_T(e)$ denotes the set of locks held by thread T at location e.

Synergy Between Backward and Forward Lock Causality Edges. Note that in order to deduce that a7 and b7 are not pairwise reachable, consider causality edges induced by both backward and forward seed edges ignoring either of which may cause us to incorrectly deduce that a7 and b7 are reachable. For example, in the above example if we ignore the backward seed edges then we will construct the unidirectional lock causality graph $L_{(x^1,x^2)}$ shown in FIG. 4 which is acyclic. Thus the lock causality graph construction of the prior art is inadequate in reasoning about bi-directional pairwise reachability.

Bounding the Size of the Lock Causality Graph: Under the assumption of bounded lock chains, we show that the size of the bidirectional lock causality graph is bounded. From METHOD 1, it follows that each causality edge is induced either by an existing induced causality edge or a backward or forward seed edge. Thus, for each induced causality edge e, there exists a sequence $e_0, \ldots, e_n$ of causality edges such that $e_0$ is a seed edge and for each $i \geq 1$, $e_i$, e is induced by $e_{i-1}$. Such a sequence is referred to as a lock causality sequence. Under the assumption of bounded lock chains, the length of any lock causality sequence is bounded. Note that the number of seed edges is at most $4|L|$, where $|L|$ is the number of locks in the given concurrent program. Since the number of seed edges is bounded, and since the length of each lock causality sequence is bounded, the number of induced edges in each bi-directional lock causality graph is also bounded leading to the following result.

Theorem 2. (Bounded Lock Causality Graph). If the length of each lock chain generated by local paths $x^1$ and $x^2$ of threads $T_1$ and $T_2$, respectively, is bounded then the size (number of vertices) of $G_{(x^1,x^2)}$, is also bounded.

Lock Causality Automata: When model checking a single PDS, we exploit the fact that the set of configurations satisfying a given LTL formula is regular and can therefore be captured via a finite automaton also called a multi-automaton. For a concurrent program with two PDSs, however, we need to reason about pairs of regular sets of configurations. Thus, instead of performing pre*-closures over multi-automata, we need to perform pre*-closures over automata pairs.

Suppose that we are given a pair $(R_1, R_2)$ of sets, where $R_i$ is a regular set of configurations of thread $T_i$. The set $S_i$ of configurations of $T_i$ that are (locally) backward reachable from $R_1$ fours a regular set. However, given a pair of configurations $(a_1, a_2)$, where $a_i \in S_i$, even though $a_i$ is backward reachable from some $b_i \in R_i$ in $T_i$, there is no guarantee that $a_1$ and $a_2$ are pairwise backward reachable from $b_1$ and $b_2$ in the concurrent program CP. That happens only if there exists local paths $x^1$ and $x^2$ of threads $T_1$ and $T_2$, respectively, from $a_i$ to $b_i$ such that $G_{(x^1,x^2)}$ is acyclic. Thus, in computing the pre*-closure $S_i$ of $R_i$ in thread $T_i$, we need to track relevant lock access patterns that permit us to deduce acyclicity of the lock causality graph $G_{(x^1,x^2)}$.

To capture the set of global states of CP that are backward reachable from $(R_1, R_2)$, we introduce the notion of a Lock Causality Automaton (LCA). An LCA is a pair of automata $\mathcal{L} = \mathcal{L}_1, \mathcal{L}_2$), where $\mathcal{L}_i$ accepts the regular set of configurations of $T_i$ that are backward reachable from $R_i$. For $\mathcal{L}$ to accept precisely the set of global states $(a_1, a_2)$ that are pairwise backward reachable from $(b_1, b_2) \in (R_1, R_2)$, we encode the existence of a pair of local paths $x^i$ from $a_i$ to $b_i$ generating an acyclic lock causality graph in the acceptance condition of $\mathcal{L}$. For concurrent programs with nested locks, this was accomplished by tracking forward and backward acquisition histories and incorporating a consistency check for these acquisition histories (a necessary and sufficient condition for pairwise reachability) in the acceptance condition of $\mathcal{L}$. A feature of acquisition histories that we exploited was that they are defined locally for each thread and could therefore be tracked during the (local) computation of the pre*-closure of $R_i$. In contrast, the lock causality graph depends on lock access patterns of both threads. Thus, we need to locally track relevant information about lock accesses in a manner that allows us to re-construct the (global) lock causality graph. Towards that end, the following result is employed. Let L be the set of locks in the given concurrent program and let $\Sigma_L = \cup_{l \in L} \{a_l, r_l\}$, where $a_l$ and $r_l$ denote labels of transitions acquiring and releasing lock l, respectively, in the given program.

Theorem 3. (Regular Decomposition): Let G be a directed bipartite graph over nodes labeled with lock acquire/release labels from the set $\Sigma_L$. Then there exist regular automata $G_{11}, \ldots G_{1n}, G_{21}, \ldots, G_{2n}$ over $\Sigma_L$ such that the set $\{(x^1, x^2) | x^1 \in \Sigma^*_L, x^2 \in \Sigma^*_L, G_{(x^1,x^2)} = G\}$ can be represented as $\cup_i L(G_{i1}) \times L(G_{i2})$, where $L(G_{ij})$ is the language accepted by $G_{ij}$.

To prove this result, we introduce the notion of a lock schedule. The motivation behind the definition of a lock schedule is that not all locking events, i.e., lock/unlock statements, along a local computation x of a thread T need occur in a lock causality graph involving x. A lock schedule u is intended to capture only those locking events $u:u_0, \ldots, u_m$ that occur in a lock causality graph. The remaining locking events, i.e., those occurring between $u_i$ and $u_{i+1}$ along x are specified in terms of its complement set $F_i$, i.e., symbols from $\Sigma_L$ that are forbidden to occur between $u_i$ and $u_{i+1}$. We require that if $u_i$ is the symbol $a_1$, representing the acquisition of lock l and if its matching release $r_1$ is executed along x, then that matching release also occurs along the sequence u, i.e., $u_j = r_1$ for some j>i. Also, since l cannot be acquired twice, to preserve locking semantics the letters $a_1$ and $r_1$ cannot occur between $u_i$ and $u_j$ along x. This is captured by including $a_1$ and $r_1$ in each of the forbidden sets $F_i, \ldots, F_{j-1}$.

Definition (Lock Schedule). A lock schedule is a sequence $u_o, \ldots, u_m \in \Sigma^*_L$ having for each i, a set $F_i \subset \Sigma_L$ associated with $u_i$ such that if $u_i = a_l$ and $u_j$ its matching release, then for each k such that we have $i \leq k \leq j$ we have $r_1, a_1 \in F_k$. We denote such a lock schedule by $u_0 F_0 u_1 \ldots u_m F_m$. We say that a sequence $x \in \Sigma^*_L$ satisfies a given lock schedule $\text{sch} = u_0 F_0 u_1 \ldots u_m$, denoted by $\text{sch} | = x$, if $x \in u_0 (\Sigma_L \setminus F_0)^* u_1 \ldots u_m (\Sigma_L \setminus F_m)^*$. The following is an easy consequence of the above definition.

Lemma 4. The set of sequences in $\Sigma^*_L$ satisfying a given lock schedule is regular. Theorem 5. Given a lock causality graph G, we can construct a finite set $SCH_G$ of pairs of lock schedules such that the set of pairs of sequences in $\Sigma^*_L$ generating G is precisely the set of pairs of sequences in $\Sigma^*_L$ satisfying at least one schedule pair in $SCH_G$, i.e., $\{(x^1,x^2)|x^1, x^2 \in \Sigma^*_L, G_{(x^1,x^2)}=G\}=\{(y^1, y^2)|y^1, y^2 \in \Sigma^*_L$, for some $(sch_1, sch_2) \in SCH_G, sch_1=y^1$ and $sch_2=y^2\}$.

Lock Causality Automata: We now define the notion of a Lock Causality Automata. Since for programs with bounded lock chains, the number of lock causality graphs is bounded (see Theorem 2), so is the number of acyclic lock causality graphs. With each acyclic lock causality graph G we can, using Theorem 5, associate a finite set $ACYC_G$ of automata pairs that accept all pairs of sequences in $\Sigma^*_L \times \Sigma^*_L$ generating G. By taking the union over all acyclic lock causality graphs G, we construct the set of all automata pairs that accept all pairs of sequences in $\Sigma^*_L \times \Sigma^*_L$ generating acyclic lock causality graphs. We denote all such pairs by ACYC. Let $(G_{11}, G_{12}), \ldots, (G_{1n}, G_{2n})$ be an enumeration of all automata pairs of ACYC.

Recall LCAs are defined to capture the pre*-closure, i.e., the set of pairs of configurations that are pairwise backward reachable from a pair of configurations in $(R_1, R_2)$ where $R_i$ is a regular set of configurations of $T_i$. We therefore define an LCA to be a pair of the form $\mathcal{L}=(\mathcal{L}_1, \mathcal{L}_2)$, where $\mathcal{L}_i$ is a multi-automaton accepting the set of configurations of $T_i$ that are backward reachable from configurations in $R_i$. Note that if $(a_1, a_2)$ is pairwise backward reachable from $(b_1,b_2) \in (R_1, R_2)$ then $a_i$ is accepted by $\mathcal{L}_i$. However, due to scheduling constraints imposed by locks not all pairs of the form $(c_1,c_2)$, where $c_i$ is accepted by $\mathcal{L}_i$, are pairwise backward reachable from $(b_1,b_2)$. For $\mathcal{L}$ to accept precisely the set of global configurations $(a_1, a_2)$ that are pairwise backward reachable from $(b_1,b_2)$, we encode the existence of local paths $x^i$ from $a_i$ to $b_i$ generating an acyclic lock causality graph in the acceptance condition of $\mathcal{L}$. Towards that end, when performing the backward pre*-closure in computing $\mathcal{L}$, we track not simply the set of configurations c of $T_i$ that are backward reachable from $R_i$ but also the lock schedules encountered in reaching c.

In deciding whether configurations $c_1$ and $c_2$ are pair-wise backward reachable from $b_1$ and $b_2$, where $(b_1,b_2) \in (R_1,R_2)$, we only need to check whether for each $i \in [1 \ldots 2]$, there exists lock schedules $sch_i$ from $c_i$ to $b_i$ such that $G_{(sch_1, sch_2)}$ is acyclic, i.e., for some j, $(sch_1, sch_2) \in L(G_{1j}) \times L(G_{2j})$. Since, in performing backward pre*-closure for each thread $T_i$, we track local computation paths and hence lock schedules in the reverse manner, we have to consider the reverse of regular languages accepted by $G_{ij}$.

Motivated by this, for each i, j, we let $G^r_{ij}$ be a regular automata accepting the language resulting by reversing each word in the language accepted by $G_{ij}$. Then $c_1$ and $c_2$ are pairwise backward reachable from $b_1$ and $b_2$ if there exists for each i, a (reverse) lock schedule $rsch_1$ along a path $y^i$ from $b_i$ to $c_i$, such that for some j, $rsch_1$ is accepted by $G^r_{1j}$ and $rsch_2$ is accepted by $G^r_{2j}$. Thus, when computing the backward pre*-closure in thread $T_i$, instead of tracking the sequence $z^i$ of lock/unlock statements encountered thus far, it suffices to track for each j, the set of possible current local states of the regular automata $G^r_{ij}$ reached by traversing $z^i$ starting at its initial state. Indeed, for each i, j, let $G^r_{ij}=(Q_{ij},\delta_{ij},in_{ij},F_{ij})$, where $Q_{ij}$ is the set of states of $G^r_{ij}$, $\delta_{ij}$ its transition relation, $in_{ij}$ its initial state and $F_{ij}$ its set of final states. Let $S_{ij}(rsch_i)=\delta_{ij}(in_{ij},rsch_i)$. Then, the above condition can be re-written as follows: $c_1$ and $c_2$ are pairwise backward reachable from $b_1$ and $b_2$ if there exists for each i, a lock schedule $rsch_i$ along a path $y^i$ from $b_i$ and $c_i$, such that for some $j, S_{1j}(rsch_1) \cap F_{1j} \neq \phi$ and $j, S_{2j}(rsch_2) \omega F_{2j} \neq \wp$.

Thus, in performing pre*-closure in thread $T_i$, we augment the local configurations of $T_i$ to track for each i, j, the current set of states of $G_{ij}$ induced by the lock/unlock sequence seen so far. Hence an augmented configuration of $T_i$ now has the form: $\langle (c,FLS,BLS,GS_{i1}, \ldots, GS_{in}),u \rangle$, where FLS and BLS are the forward and backward lock-sets (see Theorem 1) at the start and end points and $GS_{ij}$ is the set of states of $G^r_{ij}$ induced by the lock/unlock sequences seen so far in reaching configuration $\langle c, u \rangle$. To start with $GS_{ij}$ is set to $\{in_{ij}\}$, the initial state of $G^r_{ij}$.

Lock Augmented Multi-Automata: Formally, a lock augmented multi-automaton can be defined as follows: Let $T_i$ be the pushdown system $(Q_i,Act_i,\Gamma_i,c_{j0},\Delta_i)$. A Lock Augmented $T_i$-Multi-Automaton is a tuple $\mathcal{M}_i = (\Gamma_i,P_i,\delta_i,I_i,F_i)$, where $P_i$ is a finite set of states, $\delta_i \subset P_i$ is a set of transitions, $I_i=\{(c,FLS, BLS,GS_{i1}, \ldots, GS_{in}) | \overline{c} \in Q_i, BLS,FLS \subseteq L, GS_{ij} \subseteq Q_{ij}\} \subseteq P_i$ is a set of initial states and $F_i \subseteq \overline{P_i}$ is a set of final states. $\mathcal{M}_i$ accepts an augmented configuration $\langle (c,FLS, BLS,GS_{i1}, \ldots, GS_{in})),u \rangle$ if starting at the initial state $(c,FLS, BLS,GS_{i1}, \ldots, GS_{in}))$ there is a path in $M_i$ labeled with u and leading to a final state of $\mathcal{M}_i$. Note that the only difference between a lock augmented multi-automation and the standard multi-automaton is that the control state is augmented with the lockset information BLS and FLS, and the subsets $GS_{ij}$ used to track lock schedules.

A lock causality automaton is then defined as follows: Definition (Lock Causality Automaton) Given threads $T_1=(Q_1,Act_1,\Gamma_1,c_1,\Delta_1)$ and $T_2=(Q_2,Act_2,\Gamma_2,c_2,\Delta_2)$, a lock causality automaton is a pair $(\mathcal{L}_1,\mathcal{L}_2)$ where $\mathcal{L}_i$ is a lock augmented $T_i$-multi-automaton. The acyclicity check (Theorem 1) for pairwise reachability is encoded in the acceptance criterion of an LCA.

Definition (LCA-Acceptance). We say that LCA $\mathcal{L}=\mathcal{L}_1$, $\mathcal{L}_2$ accepts the pair $c_1, c_2$ where $c_i=\langle c_i,u_i \rangle$ is a configuration of $T_i$, if there exist lock sets $BLS_i$ and $FLS_i$, and sets $GS_{ij} \subseteq Q_{ij}$, such that:

1. for each i, the augmented configuration $\langle (c,FLS_i,BLS_i, GS_{i1}, \ldots, GS_{in})),u_i \rangle$ is accepted by $\mathcal{L}_i$,
2. $FLS_1 \cap FLS_2 = \phi$ and $BLS_1 \cap BLS_2 = \phi$ and,
3. there exists k such that $GS_{1k} \cap F_{1k} \neq \phi$ and $GS_{2k} \cap F_{2k} \neq \wp$.

Condition 1 checks for local thread reachability, condition 2 checks for disjointness of lock sets and condition 3 checks for acyclicity of the lock causality graph induced by the lock schedules leading to $\langle c_1,u_1 \rangle$ and $\langle c_2,u_2 \rangle$.

Computing LCAs for Operators: We now show how to construct LCAs for 1. Boolean Operators: $\vee$ and $\wedge$, and 2. Temporal Operators: F,$\overset{\infty}{F}$ and X. Computing LCA for F, given an LCA $\mathcal{L}=(\mathcal{L}_1,\mathcal{L}_2)$, a goal is to compute an LCA $\mathcal{M}$, denoted by pre*($\mathcal{L}$), accepting the pair $b_1, b_2$ of augmented configurations that is pairwise backward reachable from some pair $a_1,a_2$ accepted by $\mathcal{L}$. In other words, $\mathcal{M}$ must accept the pre*-closure of the set of states accepted by $\mathcal{L}$. We first show how to compute the pre*-closure of a lock augmented $T_i$-multi-automaton.

Computing the pre*-closure of a Lock Augmented Multi-Automaton, given a lock augmented $T_i$-multiautomaton $\mathcal{A}$, we show how to compute another lock augmented $T_i$-multi-automaton $\mathcal{B}$, denoted by pre*($\mathcal{A}$), accepting the pre*-closure of the set of augmented configurations of $T_i$ accepted by $\mathcal{A}$. We recall that each augmented configuration of $\mathcal{A}$ is of the form $\langle (c,FLS,BLS,GS_{i1}, \ldots, GS_{in});u \rangle$, where c is a control state of $T_i$, u its stack content, FLS and BLS are lock-sets, and $GS_{ij}$ is the set of states of $G_{ij}$ induced by the lock schedules seen so far in reaching configuration $\langle c, u \rangle$. We set $\mathcal{A}_0 = \mathcal{A}$ and construct a finite sequence of lock-augmented multi-automata $\mathcal{A}_0, \ldots, \mathcal{A}_p$ resulting in $\mathcal{B} = \mathcal{A}_0$. Towards that end, we use $\rightarrow_i$ to denote the transition relation of $\mathcal{A}_i$. For every $i \geq 0$, $\mathcal{A}_{i+1}$ is obtained from $\mathcal{A}_i$ by conserving the sets of states and transitions of $\mathcal{A}_i$ and adding new transitions as follows:

1. for every stack transition $(c,\gamma) \hookrightarrow (c', w)$ and every state q such that $$(c', FLS, BLS, GS_{i1}, \ldots, GS_{in}) \xrightarrow{w}_i q,$$

we add the transition $$(c, FLS, BLS, GS_{i1}, \ldots, GS_{in}) \xrightarrow{\gamma}_{i+1} q.$$

2. for every lock release operation $c \xrightarrow{r_1} c'$ and for every state $(c', FLS, BLS, GS_{i1}, \ldots, GS_{in})$ of $\mathcal{A}_i$, we add a transition $$(c, FLS, BLS', GS'_{i1}, \ldots, GS'_{in}) \xrightarrow{\varepsilon}_{i+1} (c', FLS, BLS, GS_{i1}, \ldots, GS_{in})$$

to $\mathcal{A}_{i+1}$, where $\varepsilon$ is the empty symbol; $BLS' = BLS \cup \{l_i\}$ and for each j, $GS'_{ij} = \delta_{ij}(GS_{ij}, r_1)$.

3. for every lock acquire operation $c \xrightarrow{a_1} c'$ and for every state $(c', FLS, BLS, GS_{i1}, \ldots, GS_{in})$ of $\mathcal{A}_i$, we add a transition $$(c, FLS', BLS', GS'_{i1}, \ldots, GS'_{in}) \xrightarrow{\varepsilon}_{i+1} (c', FLS, BLS, GS_{i1}, \ldots, GS_{in}),$$

to $\mathcal{A}_{i+1}$ where $\varepsilon$ is the empty symbol; $BLS' = BLS \setminus \{l\}$; $FLS' = (FLS \cup \{l\}) \setminus BLS$; and for each j, $GS'_{i1} = \delta_{ij}(GS_{ij}, a_1)$.

In the above pre*-closure computation, the stack transitions do not affect the 'lock-augmentations' and are therefore handled in the standard way. For a lock acquire (release) transitions labeled with $a_1(r_1)$ we need to track the access patterns in order to determine acyclicity of the induced LCGs. Thus in steps 2 and 3 for adding new transitions, for each $GS_{ij}$, we compute the set $\delta_{ij}(Gs_{ij}, a_1)$ of its successor states via the symbol $r_i(a_1)$ in the regular automaton $G^r_{ij}$ tracking reverse schedules. Moreover, the backward lockset in any configuration is simply the set of locks for which release statements have been encountered during the backward traversal but not the matching acquisitions. Thus, if a release statement $r_1$ for lock l is encountered, l is included in BLS (adding new transitions step 2). If later on the acquisition statement at in encountered then l is dropped from the BLS (adding new transitions step 3). Finally, the forward lock-set is simply the set of locks acquired along a path that are not released. Thus, a lock is included in FLS if a lock acquisition symbol is encountered during the backward traversal such that its release has not yet been encountered, i.e., $r_1 \notin$ BLS. Thus, $FLS' = (FLS \cup \{l\}) \setminus BLS$ (adding new transitions step 3).

LCA for F: Given an LCA $\mathcal{A} = (\mathcal{A}_1, \mathcal{A}_2)$, we define pre*($\mathcal{A}$) to be the LCA (pre*($\mathcal{A}_1$), pre &*($\mathcal{A}_2$)).

Computation of $\wedge$: Let A and B be sets of pairs of configurations accepted by LCAs $\mathcal{A} = (\mathcal{A}_1, \mathcal{A}_2)$ and $\mathcal{B} = (\mathcal{B}_1, \mathcal{B}_2)$, respectively. We show how to construct an LCA accepting $A \cap B$ via the standard product construction. For $1 \leq i \leq 2$, let $T_i = (Q_i, Act_i, \Gamma_i, c_i, \Delta_i)$, $\mathcal{A}_i = (\Gamma_i^{\mathcal{A}}, P_i^{\mathcal{A}}, \delta_i^{\mathcal{A}}, I_i^{\mathcal{A}}, F_i^{\mathcal{A}})$ and $B_i = (\Gamma_i^{\mathcal{B}}, P_i^{\mathcal{B}}, \delta_i^{\mathcal{B}}, I_i^{\mathcal{B}}, F_i^{\mathcal{B}})$. Note that for $1 \leq i \leq 2$, $\Gamma_i^{\mathcal{A}} = \Gamma_i^{\mathcal{B}} = \Gamma_i$ and $I_i^{\mathcal{A}} = I_i^{\mathcal{B}} = I_i$. Then, we define the LCA $\mathcal{N} = (\mathcal{N}_1, \mathcal{N}_2)$, where $\mathcal{N}_i$ is a multi-automaton accepting $A \cap B$, as the tuple $(\Gamma_i^{\mathcal{N}}, P_i^{\mathcal{N}}, \delta_i^{\mathcal{N}}, I_i^{\mathcal{N}}, F_i^{\mathcal{N}})$, where 1. $\Gamma_i^{\mathcal{N}} = \Gamma_i$; 2. $P_i^{\mathcal{N}} = P_i^{\mathcal{A}} \times P_i^{\mathcal{B}}$; 3. $I_i^{\mathcal{N}} = I_i$; 4. $F_i^{\mathcal{N}} = F_i^{\mathcal{A}} \times F_i^{\mathcal{B}}$; and 5.

$$\delta_i^{\mathcal{N}} = \{(s_1, s_2) \xrightarrow{a} (t_1, t_2) \mid s_1 \xrightarrow{a} t_1 \in \delta_i^{\mathcal{A}}, s_2 \xrightarrow{a} \in \delta_i^{\mathcal{B}}\}.$$

A minor technicality is that to satisfy the requirement in the definition of a lock-augmented multi-automaton that $I_i \in P_i^{\mathcal{N}}$, we 're-name' states of the form (s,s), where $s \in I_i^{\mathcal{A}}$ as simply s. The correctness of the construction follows from the fact that it is merely the standard product construction with minor changes. The computation of $\vee$ is analogous to the above construction.

Computation of $\overset{\infty}{F}$: We show how to reduce the construction of an LCA for $\overset{\infty}{F}$, to that for the temporal operator F and the boolean operators $\wedge$ and $\vee$. Towards that end we leverage a Dual Pumping Lemma and show that is holds not only for threads with nested locks but more generally for threads with bounded lock chains.

Dual Pumping. Let CP be a concurrent program comprised of the threads $T_i = (P_1, Act_1, \Gamma_1, c_1, \Delta_1)$ and $T_2 = (P_2, Act_2, \Gamma_2, c_2, \Delta_2)$ and let f be an LTL property. Let BP denote the Büchi system formed by the product of CP and B¬f, the Büchi automaton corresponding to ¬f. Then LTL model checking reduces to deciding whether there exists an accepting path of BP. The Dual Pumping Lemma allows us to reduce the problem of deciding whether there exists an accepting computation of BP, to showing the existence of a finite lollipop-like witness with a special structure comprised of a stem ρ which is a finite path of BP, and a pseudo-cycle which is a sequence ν of transitions with an accepting state of BP having the following two properties (i) executing ν returns each thread of the concurrent program to the same control location with the same symbol at the top of its stack as it started with, and (ii) executing it does not drain the stack of any thread, viz., any symbol that is not at the top of the stack of a thread to start with is not popped during the execution of the sequence. For ease of exposition, we make the assumption that along all infinite runs of BP any lock that is acquired is eventually released. This restriction can be dropped.

Figure 5:
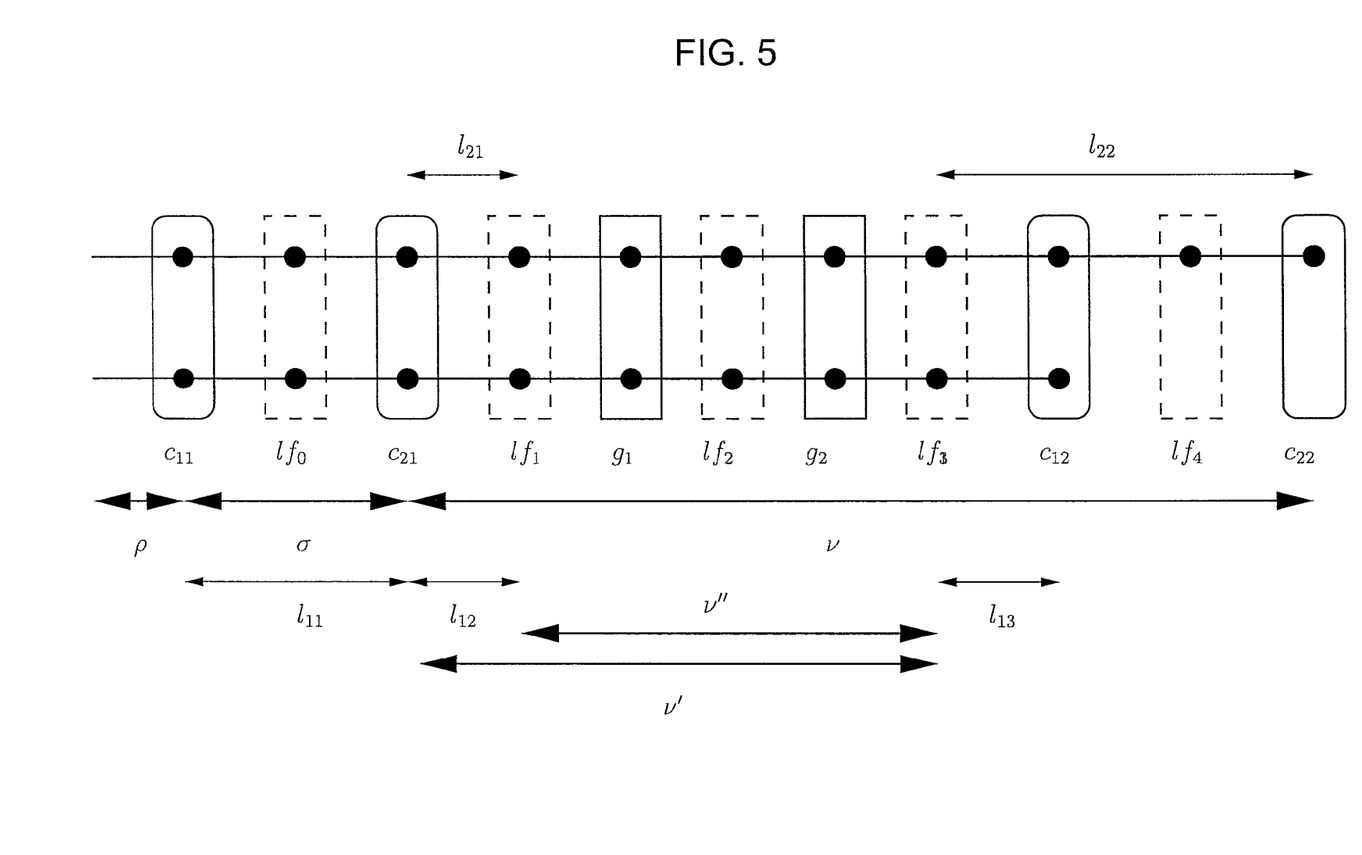
FIG. 5 is a diagram showing a pumpable witness with lock acquisitions and releases in accordance with an illustrative example.

Referring to FIG. 5, a pumpable witness is illustratively depicted for ease of understanding the following description. Theorem 6. (Dual Pumping Lemma). BP has an accepting run starting from an initial configuration c if and only if there exist $\alpha \in \Gamma_1$, $B \in \Gamma_2$; $u \in \Gamma^*_1$; $v \in \Gamma^*_2$; an accepting configuration g; configurations $lf_0$, $lf_1$, $lf_2$ and $lf_3$ in which all locks are free; lock values $l_1, \ldots, l_m, l'_1, \ldots, l'_m$; control states p',p'''$\in P_1$, q', q''$\in P_2$; u',u'',u'''$\in \Gamma^*_1$ and v',v'',v'''$\in \Gamma^*_2$ satisfying the following conditions:

$c \Rightarrow (\langle p, \alpha u \rangle, \langle q', v' \rangle, l_1, \ldots, l_m)$  A.

$(\langle p, \alpha \rangle, \langle q', v' \rangle l_1, \ldots l_m) \Rightarrow lf_0 \Rightarrow (\langle p', u' \rangle \langle q, \mathcal{B} \rangle,$
$l'_1, \ldots, l_m)$  B.

$(\langle p', u' \langle, \rangle q, \mathcal{B} \rangle, l'_1, \ldots, l'_m)$  C.

$\Rightarrow lf_1 \Rightarrow g \Rightarrow lf_2$ $\Rightarrow (\langle p, \alpha u''' \rangle \langle q'', v'' \rangle, l_1, \ldots, l_m) \Rightarrow lf_3$ $\Rightarrow (\langle p''', u''' \rangle \mathcal{B} q, \langle v''' \rangle, l'_1, \ldots, l'_m).$ Let $\rho$, $\sigma$, $\nu$ be the sequences of global configurations realizing conditions A, B and C, respectively. We first define sequences of transitions spliced from (8), (9), and (4) that we will concatenate to construct an accepting path of BP.

I. $l_{11}$: the local sequence of $T_i$ fired along $\sigma$.

II. $l_{12}$: the local sequence of $T_i$ fired along $\nu$ between $c_{21}=(\langle p',u'\langle,\rangle q, \mathcal{B}\rangle, l'_1, \ldots, l'_m)$ and $lf_1$.

III. $l_{13}$: the local sequence of $T_i$ fired along $\nu$ between $lf_2$ and $c_{i2}$ $(\langle p,\alpha u''\rangle,\langle q''\rangle,l_1,\ldots,l_m)$.

IV. $l_{21}$: the local sequence of $T_2$ fired along $\nu$ between $c_{21}(\langle p',u'\rangle,\langle q, \mathcal{B}\rangle, l'_1, \ldots, l'_m)$ and $lf_1$.

V. $l_{22}$: the local sequence of $T_2$ fired along $\nu$ between $l/f_2$ and $c_{22}(\langle p''',u'''\rangle,\langle q,\mathcal{B}v'''\rangle,l_1,\ldots,l_m)$ VI. $\nu'$: the sequence of global transitions fired along $\nu$ till $lf_2$ VII. $\nu''$: the sequence of global transitions fired along $\nu$ between $lf_1$ and $lf_2$.

Then $\pi$: $\rho\sigma\nu'(l_{13}l_{11}l_{12}l_{22}l_{21}\nu'')^w$ is a scheduling realizing an accepting valid run of BP. Thread $T_i$ is pumped by firing the sequence $l_{13}l_{11}l_{12}$ followed by the local computation of $T_i$ along $\nu''$. Similarly, $T_2$ is pumped by firing the sequence $l_{22}l_{21}$ followed by the local computation of $T_2$ along $\nu''$. The lock free configurations $lf_0, \ldots, lf_3$ are breakpoints that help in scheduling to ensure that it $\pi$ is a valid path. Indeed, starting at $lf_2$, we first let $T_i$ fire the local sequences $l_{31}l_{11}$ and $l_{12}$. This is valid as $T_2$ which currently does not hold any lock does not execute any transition and hence does not compete for locks with $T_i$. Executing these sequences causes $T_i$ to reach the local configuration of $T_i$ in $lf_1$ which is lock free. Thus, $T_2$ can now fire the local sequences $l_{22}$ and $l_{21}$ to reach the local configuration of $T_2$ in $lf_1$ after which we let CP fire $\nu''$ and then repeat the procedure.

A reason why the Dual Pumping Lemma can be generalized for threads with bounded lock chains is the fact that boundedness of lock chains guarantees that under the assumption that every lock acquired is eventually released, there will be infinitely many lock-free states along any infinite computation which ensures existence of the breakpoints. Note that if the lock chains are unbounded in length the existence of such breakpoints is not guaranteed.

Constructing an LCA for $\tilde{F}$: Conditions A, B and C in the statement of the Dual Pumping Lemma can easily be reformulated via a combination of $\cup$, $\cap$ and pre*-closure computations for regular sets of configurations. This immediately implies that the computation of an LCA for $\tilde{F}$ can be reduced to that for F, $\wedge$ and $\vee$. The computation of X can be handled in a similar fashion.

The Model Checking Procedure for $L(X,F,\tilde{F})$: Given an LCA $\mathcal{L}_g$ accepting the set of states satisfying a formula g of $L(X, F, \tilde{F})$, we formulated for each temporal operator Op $\in \{X, F, \tilde{F}\}$ a procedure for computing an LCA $\mathcal{L}_{Opg}$ accepting the set of all configurations that satisfy Opg. Given a property f, by recursively applying these procedures starting from the atomic propositions and proceeding inside out in f we can construct the LCA $\mathcal{L}_f$ accepting the set of states of CP satisfying f. Finally, CP satisfies f if the initial global state of CP is accepted by $\mathcal{L}_f$.

Maintaining Consistency Across Operators: In composing LCAs for different operators the following technical issue needs to be handled: Consider the LTL formula $f=F(a\wedge Fb)$.

Then the model checking procedure as described with respect to FIG. 1 would proceed by first building LCAs $\mathcal{L}_a=(\mathcal{L}_a^1, \mathcal{L}_a^2)$ and $\mathcal{L}_b=(\mathcal{L}_b^1, \mathcal{L}_b^2)$ for the atomic propositions a and b, respectively. Next, using the LCA construction for the F operator, we build an LCA $\mathcal{L}_{Fb}=(\mathcal{L}_{Fb}^1, \mathcal{L}_{Fb}^2)$ for $F_b$. Then leveraging the LCA construction for $\wedge$, we build an LCA $\mathcal{L}_{a\wedge Fb}=(\mathcal{L}_{a\wedge Fb}^1, \mathcal{L}_{a\wedge Fb}^2)$ for a$\wedge$ Fb from $\mathcal{L}_a$ and $\mathcal{L}_{Fb}$. Finally, we again use the LCA construction for F to build an LCA $\mathcal{L}_f=(\mathcal{L}_f^1, \mathcal{L}_f^2)$ for f from $\mathcal{L}_{a\wedge Fb}$.

Using our pre*-closure computation procedure, we see that $\mathcal{L}_f=(\text{pre}^*(L\mathcal{L}_{a\wedge Fb}^1), \text{pre}^*(\mathcal{L}_{a\wedge Fb}^2))$. Note that $\mathcal{L}_f^1$ captures only local reachability information in thread $T_i$. In other words, $(a_1,a_2)$ is accepted by $\mathcal{L}_f$ if there exists a state $(b_1,b_2)$ accepted by $\mathcal{L}_{a\wedge Fb}$ such that $a_i$ is backward reachable from $b_i$ in thread $T_i$ irrespective of whether $(b_1,b_2)$ satisfies a$\wedge$ Fb or not. Recall that whether $(b_1,b_2)$ satisfies a$\wedge$ Fb is encoded in the acceptance condition of $\mathcal{L}_{a\wedge Fb}$. Thus, to ensure that $(a_1, a_2)$ satisfies f we need to perform two checks (i) $(b_1,b_2)$ satisfies a$\wedge$ Fb and (ii) $(a_1,a_2)$ is backward reachable from $(b_1,b_2)$ in the given concurrent program. By our LCA construction for F, the second check is already encoded in the acceptance condition of $\mathcal{L}_f$. To make sure that the first condition is satisfied, we also have to augment this check with the acceptance condition for $\mathcal{L}_{a\wedge Fb}$. In general if there are n operators, temporal or boolean, in the given formula f, we need to perform such a check for each operator encountered in building the LCA bottom up via the above mentioned recursive procedure. This may be handled using the notion of vectors of consistency conditions—one for each operator as is known.

Figure 6:
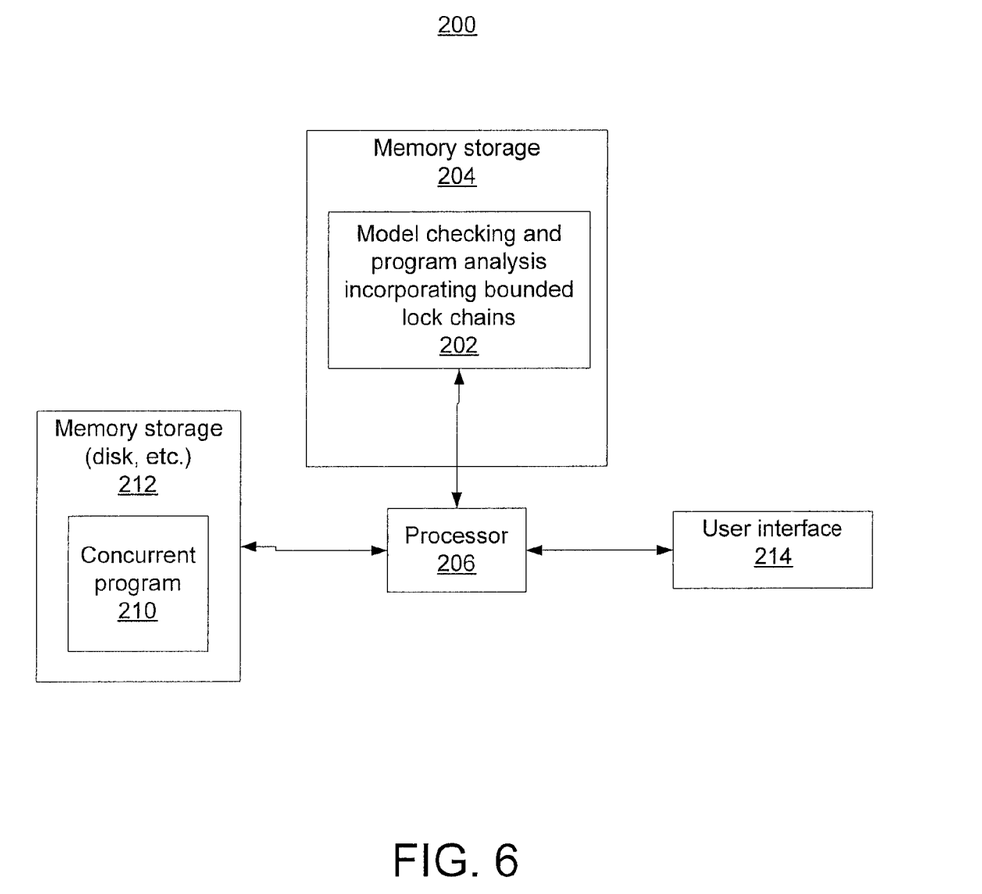
FIG. 6 is a block diagram showing a system for verifying/analyzing a concurrent program using bounded lock chains in accordance with an illustrative embodiment.

Referring to FIG. 6, a system 200 for model checking of concurrent multi-threaded programs with bounded lock chains is illustratively shown. The system may by implemented on a computer system or device configured to apply the methods described herein (e.g., FIG. 1). A model checking program 202 is preferably stored in a memory storage device 204 and executed by one or more processing cores or computer processing units 206. The model checking program 202 is configured to analyze individual program threads in a concurrent multi-threaded program 210 stored in or on memory storage media, which may include device 204, a disk or other memory device 212 including portable media, etc. The model checking program 202 determines sets of reachable states and lock access patterns for bounded lock chains, and is configured to track sets of states reachable from a given set of states and track lock acquisitions and releases by maintaining a bi-directional lock causality graph in the memory storage device 204.

The model checking program 202 is further configured to combine analysis results from multiple threads to determine whether there is a violation of a correctness property in the concurrent multi-threaded program. A graphical user interface 214 is provided to display or report errors or problems in the concurrent program 210.

Lock causality automaton are generated and stored in memory (204) to track the sets of states reachable from the given set of states in the concurrent multi-threaded program. The lock causality automaton is preferably built for each temporal operator appearing in a given correctness formula which is employed to determine errors in the concurrent program 210. Pre*-closures are computed for the lock causality automaton with bounded lock chains by projecting the lock causality automaton onto individual threads, wherein the pre*-closures of lock causality automaton are recovered by taking a cross product that does not consider all resulting pairs of local control states of the individual threads, but removes the pairs that are not reachable.

The present principles have identified fragments of LTL for which the model checking problem is decidable for threads interacting via bounded lock chains thereby delineating precisely the decidability boundary for the problem. One desirable feature of the present technique is that it enables compositional reasoning for the concurrent program at hand thereby ameliorating the state explosion problem. The new results enable us to provide a more refined characterization of the decidability of LTL model checking in terms of boundedness of lock chains as opposed to nestedness of locks.

Having described preferred embodiments of a system and method for verification of programs using threads having bounded lock chains (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for model checking of concurrent multi-threaded programs with bounded lock chains, comprising:
analyzing individual program threads in a concurrent multi-threaded program, using a model checking program stored in a memory storage device, to determine sets of reachable states and lock access patterns for bounded lock chains by:
tracking sets of states reachable from a given set of states; and
tracking lock acquisitions and releases by maintaining a bi-directional lock causality graph;
using an acceptance condition of the lock causality graph to combine analysis results from multiple threads to determine whether there is a violation of a correctness property in the concurrent multi-threaded program;
reducing a reachability problem by taking a specialized cross product that removes pairs that are not reachable; and
keeping projection automata separate to circumvent a state explosion problem and avoid construction of a global automata.

2. The method as recited in claim 1, wherein a lock causality automaton is employed to track the sets of states reachable from the given set of states in the concurrent multi-threaded program.

3. The method as recited in claim 2, further comprising expressing a model checking problem as a reachability problem for regular sets of configurations accepted by the lock causality automaton.

4. The method as recited in claim 2, wherein the lock causality automaton is built for each temporal operator appearing in a given correctness formula.

5. The method as recited in claim 2, further comprising:
computing pre*-closures for the lock causality automaton with bounded lock chains by projecting the lock causality automaton onto individual threads; and
recovering the pre*-closures of lock causality automaton by removing pairs of local states that are unreachable by encoding reachability criterion in the acceptance condition.

6. The method as recited in claim 2, further comprising composing a lock causality automaton for each operator to form a lock causality automaton for an entire formula.

7. The method as recited in claim 6, wherein the entire formula is satisfied by the concurrent multi-threaded program if a language accepted by the lock causality automaton is non-empty.

8. The method as recited in claim 1, wherein a length of lock chains is employed to compute a bound on a size of the bi-directional lock causality graph, and the method further comprising enumerating all acyclic lock causality graphs of a size of the bound.

9. The method as recited in claim 8, wherein the acyclic lock causality graphs are employed to compute a lock causality automaton that captures a set of configurations reachable from a given set of regular configurations such that the lock causality automaton accepts sets of configurations of the concurrent multi-threaded program in accordance with set conditions.

10. A system for model checking of concurrent multi-threaded programs with bounded lock chains, comprising:
a memory storage device: and
a model checking program stored in the memory storage device and executed by one or more processing cores, the model checking program being configured to analyze, using a processor, individual program threads in a concurrent multi-threaded program stored on memory storage media to determine sets of reachable states and lock access patterns for bounded lock chains, the model checking program being configured to track sets of states reachable from a given set of states and track lock acquisitions and releases by maintaining a bi-directional lock causality graph in the memory storage device; the model checking program is configured to use an acceptance condition of the lock causality graph to combine analysis results from multiple threads to determine whether there is a violation of a correctness property in the concurrent multi-threaded program, to reduce a reachability problem by taking a specialized cross product that removes pairs that are not reachable, and to keep projection automata separate to circumvent a state explosion problem and avoid construction of a global automata.

11. The system as recited in claim 10, further comprising lock causality automaton generated to track the sets of states reachable from the given set of states in the concurrent multi-threaded program.

12. The system as recited in claim 11, wherein the lock causality automaton is built for each temporal operator appearing in a given correctness formula.

13. The system as recited in claim 11, further comprising:
pre*-closures computed for the lock causality automaton with bounded lock chains by projecting the lock causality automaton onto individual threads, wherein the pre*-closures of lock causality automaton are recovered by taking a cross product that does not consider all resulting pairs of local control states of the individual threads, but removes the pairs that are not reachable.

14. The system as recited in claim 11, wherein a lock causality automata is included for each operator to form a lock causality automaton for an entire formula.

15. The system as recited in claim 14, wherein, the entire formula is satisfied by the concurrent multi-threaded program if a language accepted by the lock causality automaton is non-empty.

* * * * *